US012762961B2

(12) United States Patent
Sui et al.

(10) Patent No.: US 12,762,961 B2
(45) Date of Patent: Oct. 13, 2026

(54) METHOD OF GENERATING CONVECTIVE WEATHER AVOIDANCE STRATEGY FOR TERMINAL FLIGHT

(71) Applicants: The Boeing Company, Arlington, VA (US); Nanjing University of Aeronautics and Astronautics, Nanjing (CN)

(72) Inventors: Dong Sui, Nanjing (CN); Shijin Wang, Nanjing (CN); Bo Wei, Nanjing (CN); Wei Yang, Nanjing (CN); Yangxue Han, Nanjing (CN); Helen H. Lee, Nanjing (CN)

(73) Assignees: The Boeing Company, Arlington, VA (US); Nanjing University of Aeronautics and Astronautics, Nanjing (CN)

( * ) Notice: Subject to any disclaimer, the term of this patent is extended or adjusted under 35 U.S.C. 154(b) by 160 days.

(21) Appl. No.: 18/640,182

(22) Filed: Apr. 19, 2024

(65) Prior Publication Data

US 2024/0371278 A1 Nov. 7, 2024

(30) Foreign Application Priority Data

May 4, 2023 (CN) ........................ 202310490413.1

(51) Int. Cl.
*G08G 5/34* (2025.01)
*G01S 13/95* (2006.01)
(Continued)

(52) U.S. Cl.
CPC ................ *G08G 5/34* (2025.01); *G01S 13/95* (2013.01); *G06F 18/23213* (2023.01); *G08G 5/76* (2025.01)

(58) Field of Classification Search
CPC ............ G08G 5/34; G08G 5/76; G08G 5/727; G08G 5/22; G08G 5/26; G08G 5/56; G01W 1/10
See application file for complete search history.

(56) References Cited

U.S. PATENT DOCUMENTS

| | | | | |
|---|---|---|---|---|
| 2020/0168104 A1* | 5/2020 | Holder | ..................... | G08G 5/55 |
| 2022/0076583 A1* | 3/2022 | Gu | ........................... | G08G 5/26 |
| 2022/0139234 A1* | 5/2022 | Chaubey | .................. | G08G 5/21<br>701/121 |

FOREIGN PATENT DOCUMENTS

| | | |
|---|---|---|
| CN | 111984878 A | 11/2020 |
| CN | 113483773 A | 10/2021 |
| EP | 3770883 A1 | 1/2021 |

OTHER PUBLICATIONS

Merriam-Webster, "chart" (Year: 2017).*
(Continued)

*Primary Examiner* — Stephanie T Su
(74) *Attorney, Agent, or Firm* — Walters & Wasylyna LLC

(57) ABSTRACT

A determination method for a weather avoidance strategy of flights includes collecting historical radar trajectory data and historical weather data of various flights in a predetermined airport terminal area, and collecting weather forecast data in real time; determining an arrival and departure typical flight route of each flight in the predetermined airport terminal area on the basis of the historical radar trajectory data and the historical weather data; acquiring deviation information indicating deviation of each flight due to severe convective weather on the basis of the historical weather data, the arrival and departure typical flight route, and the historical radar trajectory data; determining flight deviation probabilities under different weather conditions on the basis of the historical weather data, the arrival and departure typical
(Continued)

flight route and the deviation information, to generate a flight deviation probability chart; constructing a weather avoidance probability figure of the predetermined airport terminal area on the basis of the weather forecast data and the flight deviation probability chart; and formulating a weather avoidance strategy of each flight in the predetermined airport terminal area on the basis of the arrival and departure typical flight route and the weather avoidance probability figure.

20 Claims, 5 Drawing Sheets

(51) Int. Cl.
*G06F 18/23213* (2023.01)
*G08G 5/76* (2025.01)

(56) References Cited

OTHER PUBLICATIONS

MIT Lincoln Laboratory, "A global mode of tracking aircraft" (Year: 2023).*
Bombelli et al. "Strategic Air Traffic Planning with Frechet Distance Aggregation and Rerouting," Aerospace Research Central. (Year: 2017).*
Pang, Y., Xu, N., & Liu, Y. (Sep. 2019). Aircraft trajectory prediction using LSTM neural network with embedded convolutional layer. In Proceedings of the Annual Conference of the PHM Society (vol. 11, pp. 1-8). Scottsdale, AZ, USA: Phm Society. (Year: 2019).*
European Patent Office, Extended European Search Report, App. No. 24172937.5 (Oct. 7, 2024).

* cited by examiner

METHOD OF GENERATING CONVECTIVE WEATHER AVOIDANCE STRATEGY FOR TERMINAL FLIGHT

PRIORITY

This application claims priority from Chinese Pat. App. No. 202310490413.1 filed on May 4, 2023, the entire contents of which are incorporated herein by reference.

FIELD

The present invention relates to the field of aviation and, in particular, to methods and apparatus for generating convective weather avoidance strategies of terminal area flights by combining weather information with flight information.

BACKGROUND

With the rapid development of civil aviation industry in China, the effect of weather on civil aviation transportation industry is increasing, and therefore more and more attention has been paid to the research of flying of flights in convective weather. A flight deviation probability chart converts the weather product echo top (ET) and vertically integrated liquid water content (VIL) which serve as weather features into a flight deviation probability, which can integrate the two weather features to reflect the weather severity degree comprehensively, and can provide reference for air traffic controllers to formulate a convective weather avoidance strategy of flights.

At present, in China, a method for automatically judging a convective weather avoidance strategy of terminal area flights according to weather information has not been proposed yet. In convective weather, the convective weather avoidance strategy in a terminal area is artificially given by the air traffic controllers, and also there is no similar automatic product applied to air traffic management, which renders that the air traffic controllers cannot efficiently manage terminal area flights under convective weather, resulting in increased flight delays and waste of airspace resources in the terminal area; moreover, the workload of the air traffic controllers is also high under the convective weather conditions.

SUMMARY

Disclosed are methods for generating weather avoidance strategies for flights.

In one example, the disclosed method for generating a weather avoidance strategy for flights includes (1) collecting historical radar trajectory data and historical weather data of various flights in a predetermined airport terminal area, and collecting weather forecast data in real time; (2) determining an arrival and departure typical flight route of each flight in the predetermined airport terminal area on a basis of the historical radar trajectory data and the historical weather data; (3) acquiring deviation information indicating deviation of each flight due to severe convective weather on the basis of the historical weather data, the arrival and departure typical flight route, and the historical radar trajectory data; (4) determining flight deviation probabilities under different weather conditions on the basis of the historical weather data, the arrival and departure typical flight route and the deviation information, to generate a flight deviation probability chart; (5) constructing a weather avoidance probability figure of the predetermined airport terminal area on the basis of the weather forecast data and the flight deviation probability chart; and (6) formulating a weather avoidance strategy for each flight in the predetermined airport terminal area on the basis of the arrival and departure typical flight route and the weather avoidance probability figure.

Also disclosed are apparatus for generating weather avoidance strategies for flights.

In one example, the disclosed apparatus for generating a weather avoidance strategy for flights includes (1) a collection module, configured to collect historical radar trajectory data and historical weather data of various flights in a predetermined airport terminal area, and collect weather forecast data in real time; (2) a route determination module, configured to receive the historical radar trajectory data and the historical weather data from the collection module, and determine an arrival and departure typical flight route of each flight in the predetermined airport terminal area on the basis of the historical radar trajectory data and the historical weather data; (3) a deviation information acquisition module, configured to receive the historical weather data and the historical radar trajectory data from the collection module, to receive arrival and departure typical flight route data indicating the arrival and departure typical flight route from the route determination module, and to acquire deviation information indicating deviation of each flight due to severe convective weather on the basis of the historical weather data, the arrival and departure typical flight route, and the historical radar trajectory data; (4) a flight deviation probability chart generation module, configured to receive the historical weather data from the collection module, to receive arrival and departure typical flight route data indicating the arrival and departure typical flight route from the route determination module, and to receive the deviation information from the deviation information acquisition module, and to determine flight deviation probabilities under different weather conditions on the basis of the historical weather data, the arrival and departure typical flight route and the deviation information, to generate a flight deviation probability chart; (5) a weather avoidance probability figure construction module, configured to receive the weather forecast data from the collection module and to receive the flight deviation probability chart from the flight deviation probability chart generation module, and to construct a weather avoidance probability figure of the predetermined airport terminal area on the basis of the weather forecast data and the flight deviation probability chart; and (6) a weather avoidance strategy formulation module, configured to receive the arrival and departure typical flight route data from the route determination module and to receive the weather avoidance probability figure from the weather avoidance probability figure construction module, and to formulate a weather avoidance strategy of each flight in the predetermined airport terminal area on the basis of the arrival and departure typical flight route and the weather avoidance probability figure.

Also disclosed are computer-readable program medium, storing a program which, when executed by a processor, implement the disclosed methods for generating weather avoidance strategies for flights.

Other examples of the disclosed methods and apparatus for generating weather avoidance strategies for flights will become apparent from the following detailed description, the accompanying drawings, and the appended claims.

DETAILED DESCRIPTION

Figure 1:
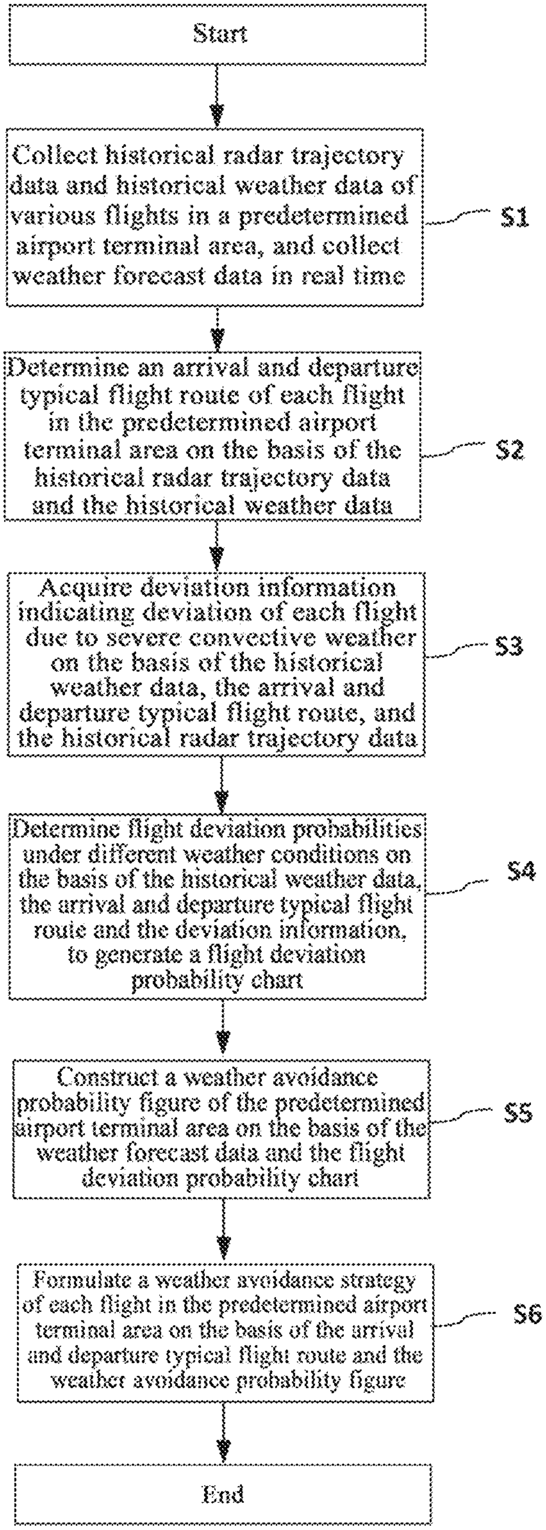
FIG. 1 is a flowchart showing a determination method for a weather avoidance strategy of flights according to embodiments of the present invention.

Embodiments of the present disclosure provide a determination method and a determination apparatus for a weather avoidance strategy of flights, which solve the problem in the related art that there is no method for automatically judging a convective weather avoidance strategy of terminal area flights on the basis of weather information, and solve the problems of increased flight delays and waste of airspace resources in the terminal area.

According to one aspect of embodiments of the present disclosure, provided is a determination method for a weather avoidance strategy of flights, comprising: collecting historical radar trajectory data and historical weather data of various flights in a predetermined airport terminal area, and collecting weather forecast data in real time; determining an arrival and departure typical flight route of each flight in the predetermined airport terminal area on the basis of the historical radar trajectory data and the historical weather data; acquiring deviation information indicating deviation of each flight due to severe convective weather on the basis of the historical weather data, the arrival and departure typical flight route, and the historical radar trajectory data; determining flight deviation probabilities under different weather conditions on the basis of the historical weather data, the arrival and departure typical flight route and the deviation information, to generate a flight deviation probability chart; constructing a weather avoidance probability figure of the predetermined airport terminal area on the basis of the weather forecast data and the flight deviation probability chart; and formulating a weather avoidance strategy of each flight in the predetermined airport terminal area on the basis of the arrival and departure typical flight route and the weather avoidance probability figure.

In one embodiment of the present disclosure, determining an arrival and departure typical flight route in the predetermined airport terminal area on the basis of the historical radar trajectory data and the historical weather data comprises: extracting the historical radar trajectory data of a plurality of flights in good weather conditions on the basis of the historical radar trajectory data and the historical weather data; and calculating the arrival and departure typical flight route in the predetermined airport terminal area on the basis of the extracted historical radar trajectory data of the plurality of flights.

In one embodiment of the present disclosure, calculating an arrival and departure typical flight route in the predetermined airport terminal area on the basis of the extracted historical radar trajectory data of the plurality of flights comprises: estimating the distance between historical radar trajectories of any two flights among the plurality of flights by using Fréchet distance, to construct a distance matrix; and clustering the constructed distance matrix using a clustering algorithm, to calculate the arrival and departure typical flight route.

In one embodiment of the present disclosure, the historical radar trajectories of any two flights comprise a first historical radar trajectory and a second historical radar trajectory; wherein estimating the distance between historical radar trajectories of any two flights among the plurality of flights by using Fréchet distance, to construct a distance matrix, comprises: creating a first trajectory point ordered set $\sigma(P)$ of the first historical radar trajectory consisting of p trajectory points and a second trajectory point ordered set $\sigma(Q)$ of the second historical radar trajectory consisting of q trajectory points, wherein $\sigma(P)=(u_1, u_2, \ldots, u_p)$ and $\sigma(Q)=(v_1, v_2, \ldots, v_q)$; pairing the created first trajectory point ordered set $\sigma(P)$ and second trajectory point ordered set $\sigma(Q)$, to obtain a sequence point pair $SC_j$: $SC_j=\{(u_{a_1}, v_{b_1}), (u_{a_2}, v_{b_2}), \ldots, (u_{a_q}, v_{b_q})\}$, $j=1, 2, \ldots, p$, where $a_1=j$, $b_1=1$, and for $i=1, \ldots, q-1$, $a_{i+1}=a_i$ and $b_{i+1}=b_i+1$; calculating the length of the sequence point pair $\|SC\|$ between the trajectory points of the first historical radar trajectory and the second historical radar trajectory, wherein the length of the sequence point pair $\|SC\|$ indicates the maximum value of the Euclidean distance of each group of sequence point pairs:

$$\|SC_j\| =, \max_{i=1,2,\ldots,q} \left(dist\left(u_{a_i}, v_{b_i}\right)\right),$$

$j=1, 2, \ldots, p$; and calculating the Fréchet distance $D_F(P,Q)$ according to the length of the sequence point pair $\|SC\|$ by using the following calculation formula:

$$D_F(P, Q) = \min_{j=1,2,\ldots,p} \|SC_j\|,$$

and taking the Fréchet distance as the distance between historical radar trajectories of any two flights among the plurality of flights.

In one embodiment of the present disclosure, clustering the constructed distance matrix using a clustering algorithm, to calculate the arrival and departure typical flight route comprises: clustering the obtained distance matrix on the basis of the Fréchet distance by using an OPTICS algorithm to generate a plurality of cluster groups; and determining a cluster centerline of the plurality of cluster groups on the basis of the generated plurality of cluster groups, and taking the cluster centerline as the arrival and departure typical flight route.

In one embodiment of the present disclosure, acquiring deviation information indicating deviation of each flight due to severe convective weather on the basis of the historical weather data, the arrival and departure typical flight route, and the historical radar trajectory data comprises: judging whether the arrival and departure typical flight route is in a severe convective weather condition on the basis of the historical weather data and the arrival and departure typical flight route; comparing the distance between the arrival and departure typical flight route determined to be in the severe convective weather condition and an actual radar trajectory of each flight based on the historical radar trajectory data with a predetermined deviation threshold; and acquiring, on the basis of the comparison result, deviation information indicating deviation of each flight due to the severe convective weather.

In one embodiment of the present disclosure, determining flight deviation probabilities under different weather conditions on the basis of the historical weather data, the arrival and departure typical flight route and the deviation information, to obtain a flight deviation probability chart, comprises: calculating a predetermined percentile of vertically integrated liquid water content and the predetermined percentile of the echo top of each flight on a corresponding arrival and departure typical flight route according to the length and width of the arrival and departure typical flight route; dividing the predetermined percentile of the vertically integrated liquid water content into a first number of grades and dividing the predetermined percentile of echo top into a second number of grades; dividing, according to values of the predetermined percentile of the vertically integrated liquid water content and values of the predetermined percentile of the echo top of various flights, various flights into different vertically integrated liquid water content grades and echo top grades; and calculating the proportion of deviation flights in all flights in each condition of a vertically integrated liquid water content grade and an echo top grade and taking the proportion as the flight deviation probability, so as to generate a flight deviation probability chart under different conditions of vertically integrated liquid water content grades and echo top grades.

In one embodiment of the present disclosure, the weather forecast data at least comprises a predetermined percentile of vertically integrated liquid water content and the predetermined percentile of echo top, wherein obtaining a weather avoidance probability figure of the predetermined airport terminal area on the basis of the weather forecast data and the flight deviation probability chart comprises: performing calculation according to a vertically integrated liquid water content value and an echo top value of the weather forecast data and with reference to the flight deviation probability chart, to obtain a flight deviation probability of divided grids with a longitude of a predetermined longitude value and a latitude of a predetermined latitude value within the range of the predetermined airport terminal area; defining a case where a deviation probability range is a first range as no need of deviation, defining a case where the deviation probability range is a second range as possible deviation, and defining a case where the deviation probability range is a third range as necessary deviation, wherein a lower limit value of the first range is 0, an upper limit value of the first range is less than or equal to a lower limit value of the second range, an upper limit value of the second range is less than or equal to a lower limit value of the third range, and an upper limit value of the third range is 100%; and constructing the weather avoidance probability figure using the first range, the second range, and the third range.

In one embodiment of the present disclosure, formulating a weather avoidance strategy of each flight in the predetermined airport terminal area on the basis of the arrival and departure typical flight route and the weather avoidance probability figure comprises: i. determining whether grids with the third range of deviation possibility cover a predetermined number of cross-sections of all the arrival and departure typical flight routes, the predetermined number being at least greater than 5; ii. if the determination result in i is yes, then arrival flights that have taken off adopting a strategy of airborne holding or alternate landing, and arrival flights and departure flights that have not taken off adopting a strategy of waiting on the ground; iii. if the determination result in i is no, determining whether there are grids with the third range of deviation probability in the arrival and departure typical flight route; iv. if the determination result in iii is no, executing the following steps: determining whether grids with the second range of deviation probability cover at least one cross-section of the arrival and departure typical flight route; if it is determined that grids with the second range of deviation probability do not cover the at least one cross-section of the arrival and departure typical flight route, then arrival and departure flights adopting a no-impact strategy; and if it is determined that grids with the second range of deviation probability cover the at least one cross-section of the arrival and departure typical flight route, then arrival and departure flights adopting an intrusion strategy to allow the arrival and departure flights to intrude the grids with the second range of deviation probability and thus to fly according to the arrival and departure typical flight route; and v. if the determination result in iii is yes, executing the following steps: determining whether grids with the third range of deviation probability cover at least one cross-section of the arrival and departure typical flight route; if it is determined that grids with the third range of deviation probability do not cover at least one cross-section of the arrival and departure typical flight route, arrival and departure flights adopting a diversion strategy, wherein the diversion strategy means that the flights bypass convective weather on the arrival and departure typical flight route and then return to the arrival and departure typical flight route to continue flying; if it is determined that grids with the third range of deviation probability cover at least one cross-section of the arrival and departure typical flight route, determining whether grids with the third range of deviation probability cover at least one cross-section of another arrival and departure typical flight route adjacent to the arrival and departure typical flight route; if it is determined that grids with the third range of deviation probability do not cover at least one cross-section of another arrival and departure typical flight route adjacent to the arrival and departure typical flight route, arrival and departure flights adopting an arrival/departure point change or initial approach fix (IAF) change strategy, arrival flights changing arrival points or IAF and departure flights changing departure points, to enter or leave the terminal area from other typical flight routes; and if the described situations of i, ii, iii, iv and v are not satisfied, arrival and departure flights adopting a radar guidance strategy and entering or leaving the terminal area in a radar guidance manner.

In one embodiment of the present disclosure, the historical radar trajectory data comprises at least one of: time, call sign, ground speed, altitude, and longitude and latitude.

According to an aspect of another embodiment of the present disclosure, provided is a determination apparatus for a weather avoidance strategy of flights, the determination apparatus being configured to implement the described determination method.

According to an aspect of another embodiment of the present disclosure, provided is a computer-readable storage medium which stores a program, wherein the program, when executed by a processor, implements the described determination method.

In the present invention, the determination method for a convective weather avoidance strategy can effectively and automatically plan a convective weather avoidance strategy of flights in a terminal area under convective weather conditions, can reduce the workload of controllers, provide reference for the controllers to plan arrival and departure flight routes of the flights under the convective weather, and is beneficial to improving the efficiency of operation management in the terminal area under the convective weather conditions. The present invention can enable pilots to fly more efficiently and safely under the convective weather, facilitating reduction of flight delays.

Hereinafter, in order to make a person skilled in the art better understand the present disclosure, the embodiments of the present disclosure will be described clearly and completely in combination with the accompanying drawings in the present disclosure. Obviously, the embodiments as described are only some embodiments rather than all embodiments of the present disclosure. On the basis of the embodiments in the present disclosure, all other embodiments obtained by a person skilled in the art without involving any inventive effort shall all fall within the scope of protection of the present disclosure.

For better understanding of the present disclosure, hereinafter, some terms involved in the present disclosure are explained.

Airport terminal area: refers to a circular airspace formed by extending upwardly a range centered on an airport and having a radius of a set distance (e.g., about 10 km).

Arrival and departure typical flight route: a route usually followed by an aircraft entering and leaving a predetermined airport terminal area in good weather conditions, and it is a route obtained by clustering similar routes of the aircraft entering and leaving the predetermined airport terminal area in good weather conditions.

Deviation: in cases where take-off and landing airports are not changed, a portion of original typical flight routes is changed, and new flight routes are selected to avoid flying over forbidden areas. Deviation intends to ensure flight safety, make full use of available airspace, reduce flight delays, and improve the accessibility of the entire air transportation network.

Severe convective weather: thunderstorm, low-altitude wind shear, atmospheric turbulence, wind and vision disorder are major weather factors that affect flight safety. Thunderstorm is an extremely dangerous phenomenon affecting flight safety, and seriously threatens the flight safety according to with wind gusts, jounce, heavy precipitation, etc., generated by the thunderstorm. The severe convective weather, also referred to as inclement weather, generally refers to disastrous weather during which phenomena such as short-time heavy precipitation, thunderstorm gale, tornado, hail, and squall line occur, with horizontal dimensions typically less than 200 km, and some of them only has a few kilometers. The life cycle of severe convective weather is short and has noticeable abruptness of about an hour to a dozen hours, and some short ones only occur for a few minutes to an hour.

With the development of civil aviation transportation industry, the number of airports and flights increases continuously, and the flights sometimes encounter severe convective weather when flying on air routes. A traditional method for judging whether a flight deviates in severe convection weather is mainly implemented by the following method: air traffic controllers and pilots together make a subjective judgment according to weather information, forecasts and experiences. At present, in China, a method for automatically judging a convective weather avoidance strategy of terminal area flights on the basis of weather information has not been proposed yet, which renders that the air traffic controllers cannot efficiently manage terminal area flights under convective weather, resulting in increased flight delays and waste of airspace resources in the terminal area; moreover, the workload of the air traffic controllers is also high under the convective weather conditions.

In order to solve the problem in the related art that there is no method for automatically judging a convective weather avoidance strategy of terminal area flights on the basis of weather information, the present disclosure provides a determination method for a weather avoidance strategy of flights. FIG. 1 is a flowchart of a determination method for a weather avoidance strategy of flights according to one embodiment of the present disclosure.

Step S1: collecting historical radar trajectory data and historical weather data of various flights in a predetermined airport terminal area, and collecting weather forecast data in real time.

A designated airport terminal area is selected as a research object; and historical radar trajectory data of flights in the selected airport terminal area as a departure airport or landing airport and historical weather data in the range of the selected airport terminal area for not less than 30 days are screened out.

As an example, the historical radar trajectory data of the flights comprises take-off time and landing time of the flights, call sign, ground speed, flying altitude, and latitude and longitude information of flight trajectory.

In addition, in an embodiment, in step S1, historical flight plan data corresponding to the filtered historical radar trajectory data is also collected. As an example, the historical flight plan data comprises flight number, estimated take-off time, actual take-off time, estimated landing time, actual landing time, take-off airport, landing airport and flight plan path information.

As an example, the historical radar trajectory data of the flights and the historical flight plan data corresponding to the filtered historical radar trajectory data can be collected from a database of the selected airport; and for subsequent data processing and use, original historical radar trajectory data can be converted into data in a readable format by using Java language.

As an example, the historical weather data is acquired from a civil aviation meteorological agency, wherein the historical weather data may comprise two pieces of meteorological index information, i.e., ET and VIL, with the resolution of 0.01° (longitude)*0.01° (latitude). The original historical weather data is in a hexadecimal format, and the original historical weather data needs to be converted into data in a readable format by using Java language. In addition, the weather forecast data can be acquired in real time from the civil aviation meteorological agency.

VIL classification of the historical weather data can be as shown in Table 1.

TABLE 1

NWS Standard Reflectivity and VIL Classification

| National Weather Service (NWS) grade | VIL (kg/m2) | Convective weather degree |
|---|---|---|
| 0 | 0.05 ≤ VIL < 0.14 | None |
| 1 | 0.14 ≤ VIL < 0.7 | Weak |
| 2 | 0.7 ≤ VIL < 3.5 | Moderate |
| 3 | 3.5 ≤ VIL < 6.9 | Heavy |
| 4 | 6.9 ≤ VIL < 12 | Very Heavy |

TABLE 1-continued

NWS Standard Reflectivity and VIL Classification

| National Weather Service (NWS) grade | VIL (kg/m2) | Convective weather degree |
|---|---|---|
| 5 | 12 ≤ VIL < 32 | Intense |
| 6 | VIL ≥ 32 | Extreme |

Step S2: determining an arrival and departure typical flight route of each flight in the predetermined airport terminal area on the basis of the historical radar trajectory data and the historical weather data.

From the historical radar trajectory data and the historical weather data collected in step S1, historical flights under clear weather (NWS grade is grade 2 or below) are selected; and parts of radar trajectory data of these flights within the terminal area are screened out, and then an arrival and departure typical flight route of each flight in the terminal area is determined on the basis of the filtered historical radar trajectory data.

As an example, the distance between historical radar trajectories of any two flights among a plurality of filtered flights is estimated by using Fréchet distance, to construct a distance matrix; and the acquired distance matrix is clustered by using a clustering algorithm, such as OPTICS, to obtain the arrival and departure typical flight route in the terminal area. Hereinafter, a specific process of obtaining the arrival and departure typical flight route in the terminal area is described by taking the OPTICS clustering algorithm as an example; however, the clustering algorithm used in the present disclosure is not limited to OPTICS, and other clustering algorithms, for example, a density-based spatial clustering of applications with noise (DBSCAN) algorithm, can be used.

For a trajectory P composed of p trajectory points and a trajectory Q composed of q trajectory points, trajectory point ordered sets σ(P) and σ(Q) of the two trajectories are created, and then $\sigma(P)=(u_1, u_2, \ldots, u_p)$ and $\sigma(Q)=(v_1, v_2, \ldots, v_q)$ are obtained, and the created trajectory point ordered sets σ(P) and σ(Q) are paired to obtain a sequence point pair $SC_j$:

$$SC_j = \{(u_{a_1}, v_{b_1}), (u_{a_2}, v_{b_2}), \ldots, (u_{a_q}, v_{b_q})\}, j = 1, 2, \ldots, p,$$

where $a_1=j$, $b_1=1$, and for $i=1, \ldots, q-1$, $a_{i+1}=a_i$ and $b_{i+1}=b_i+1$.

However, the length of the sequence point pair ||SC|| between the trajectory points of the trajectories P and Q is calculated, wherein the length of the sequence point pair ||SC|| is defined as the maximum value of the Euclidean distance of each group of sequence point pairs in p group of sequence point pairs, as shown in the following formula:

$$\|SC_j\| = \max_{i=1,2,\ldots,q}\left(dist(u_{a_i}, v_{b_i})\right), j = 1, 2, \ldots, p);$$

and the Fréchet distance $D_F(P,Q)$ is calculated according to length of the sequence point pair ||SC|| by using the following calculation formula, and is taken as the distance between the trajectory P and the trajectory Q:

$$D_F(P, Q) = \min_{j=1,2,\ldots,p} \|SC_j\|.$$

Then, a distance matrix is constructed by using the obtained distance between the trajectory P and the trajectory Q and distances obtained by processing historical radar trajectories of any two other flights in a similar manner.

Then, the obtained distance matrix is clustered on the basis of the Fréchet distance by using an OPTICS algorithm to generate a plurality of cluster groups; and on the basis of the generated plurality of cluster groups, a cluster centerline of the plurality of cluster groups is determined as the arrival and departure typical flight route.

In particular, the trajectory clustering performed by the OPTICS algorithm comprises: cluster order generation flow, cluster label acquisition flow and a flow of determining a typical trajectory as an arrival and departure typical flight route. In the OPTICS algorithm, parameters, i.e., neighborhood radius ε and the minimum number of samples MinPts within ε-neighborhood radius need to be set. Core distance refers to a minimum radius that ensures that there are exactly MinPts samples within the parameter neighborhood radius range ε, and the core distance is calculated by using a Fréchet distance. Reachable distance is the minimum neighborhood radius that makes a sample x become a core object and a sample y reach the direct density from the sample x. i.e., the larger one of the core distance of the sample x and the Fréchet distance from the sample x to the sample y.

Cluster sequence generation process: 1. Given a trajectory data set D, and an ordered queue O and a result queue R are created. Among them, the ordered queue O is used to store a core object and a directly density-reachable object of the core object, which are arranged in an ascending order according to the reachable distance; and the result sequence R is used to store an output sequence of sample points. 2. If all trajectories in trajectory data set D have been processed, the algorithm ends. Otherwise, a trajectory p which has been not processed and is a core object is selected, is put in the result queue R, and is deleted from trajectory data set D. Then all directly density-reachable trajectory samples x of p in trajectory data set D are found, and the reachable distance from x to p is calculated. If x is not in the ordered queue O, put x and the reachable distance into the ordered queue O; and if x is in the ordered queue O, then if the new reachable distance of x is smaller, the reachable distance of x is updated; and the data in the ordered queue O is finally reordered according to the reachable distance from small to large. 3. If the ordered queue O is empty, turning back to step 2; otherwise, taking the first trajectory sample y in the ordered queue O (i.e., the sample with the smallest reachable distance), put same in the result queue R, and delete y from the trajectory data set D and the ordered queue O. If y is not a core object, repeating step 3 (that is, finding a sample trajectory with the minimum reachable distance in the remaining data in the ordered queue O); and if y is a core object, find all the directly density-reachable sample points of y in the ordered queue D, calculate the reachable distance to y, and then update all the directly density-reachable sample points of y to the ordered queue O according to step 2.

Trajectory cluster label acquisition flow: determine a cluster threshold $\varepsilon_i$, compare the reachable distance reachDist and core distance coreDist of each trajectory sample with $\varepsilon_i$. If reachDist≤$\varepsilon_i$, then classify the trajectory into the current cluster group; if reachDist>$\varepsilon_i$ and coreDist>$\varepsilon_i$, then classify the trajectory as noise; and if reachDist>$\varepsilon_i$ and coreDist≤$\varepsilon_i$, then create a new cluster group and classify the trajectory into the new cluster group, until all trajectories have been subjected to judgement processing.

Flow of determining a typical trajectory as an arrival and departure typical flight rout: on the basis of the clustering results of OPTICS, find a cluster centerline, i.e. the typical flight path. Specific steps: first, finding trajectory points at two side edges; and second, filtering the edge trajectory points, wherein the filter principle is: first finding trajectory points within radius d of each edge trajectory point, and counting the number of the trajectory points, and recording the number as n. If n is greater than a threshold n_threshold, the edge trajectory point is saved; otherwise, it will be deleted; and then, the side with fewer trajectory points is recorded as S1, and the other side is recorded as S2. For a given point m in S1, find the nearest trajectory point n from S2, until each point in S1 has a corresponding point from S2. Finally, average each set of corresponding points in S1 and S2, that is, points on the cluster centerline.

Step S3: acquiring deviation information indicating deviation of each flight due to severe convective weather on the basis of the historical weather data, the arrival and departure typical flight route, and the historical radar trajectory data.

First, judging whether the flight on the determined typical flight route in the terminal area in step S2 encounters severe convective weather; if so, calculating whether the distance between the typical flight path and an actual radar trajectory of each flight indicated by the historical radar trajectory data is greater than a predetermined deviation threshold, e.g. 10 km; and if the distance is greater than the predetermined deviation threshold, then determining that the flight is a deviated flight; and if the distance is smaller than the predetermined deviation threshold, determining that the flight is a non-deviated flight. According to this, deviation information about whether all the flights are deviated is obtained.

Step S4: determining flight deviation probabilities under different weather conditions on the basis of the historical weather data, the arrival and departure typical flight route and the deviation information, to generate a flight deviation probability chart.

As an example, the width w of the arrival and departure typical flight route of flights determined in step S2 can be acquired, and w×w grids are taken as an airspace filter; if the length of the typical flight route is L, then L/w airspace filters can be obtained (L/w rounded up). Sort ET and VIL values of the w×w grids in each filter from small to large to acquire 90 percentile of VIL (90% VIL) and 90 percentile of ET values (90% ET) of each filter; and finally, the maximum 90% ET and 90% VIL values of all filters are taken as the final required values.

Figure 2:
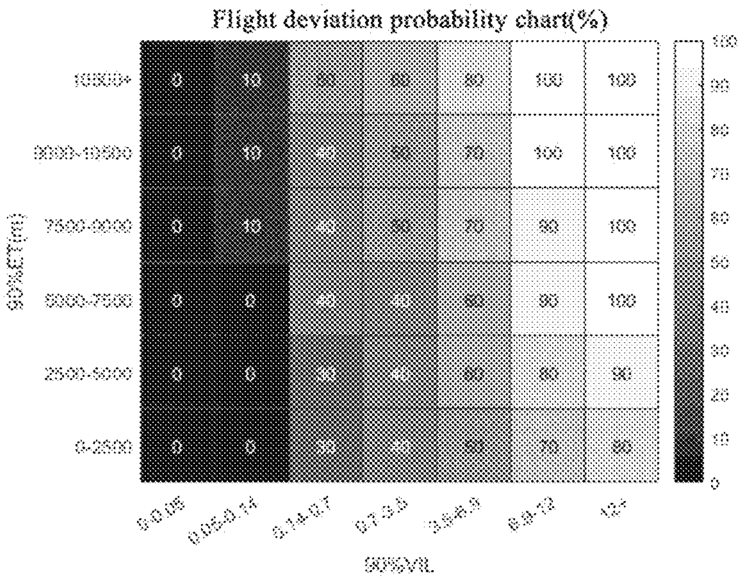
FIG. 2 is a view showing a flight deviation probability chart.

90% VIL is divided into seven grades of 0-0.05, 0.05-0.14, 0.14-0.7, 0.7-3.5, 3.5-6.9, 6.9-12, and 12+, and 90% ET is divided into six grades of 0-2500 m, 2500-5000 m, 5000-7500 m, 7500-9000 m, 9000-10500 m and 10500+. According to the 90% VIL and 90% ET values of the flights, the flights are classified into conditions of different VIL and ET grades; and the proportion of deviated flights in all flights under each weather condition is calculated on the basis of the deviation information indicating deviation of each flight due to severe convective weather, and is taken as a flight deviation probability. Then a flight deviation probability chart under different weather conditions is obtained by rounding the entire ten, as shown in FIG. 2.

Step S5: constructing a weather avoidance probability figure of the predetermined airport terminal area on the basis of the weather forecast data and the flight deviation probability chart.

Figure 3:
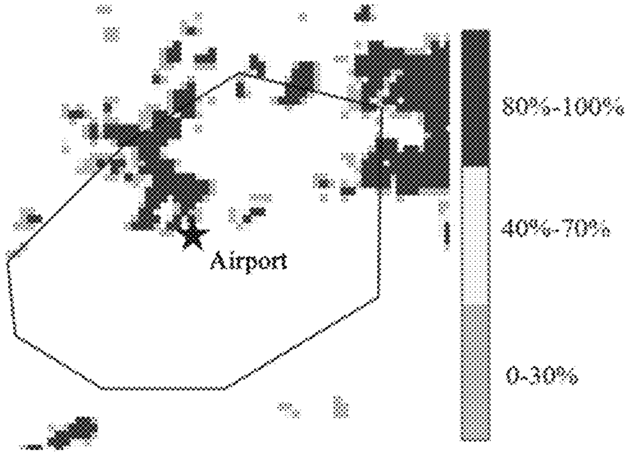
FIG. 3 is a schematic diagram showing a weather avoidance probability figure of a terminal area.

As an example, first, according to the weather forecast data collected in step S1, ET and VIL values of each grid in the range of the terminal area (X×Y grids) can be obtained; next, take n×n grids as an airspace filter, then X/n filters can be obtained horizontally and Y/n filters can be obtained vertically (X/n and Y/n are rounded up). Sort ET and VIL values of the n×n grids in each filter from small to large, to obtain 90% ET and 90% VIL. Then referring to the flight deviation probability chart generated in step S4, the deviation probability of n×n grids of the airspace filter can be obtained, and then the flight deviation probability of each 0.01° (longitude)*0.01° (latitude) grid in the range of the terminal area can be obtained. Deviation probability of 0%-30% is defined as no need of deviation, deviation probability of 40%-70% is defined as possible deviation, and deviation probability of 80%-100% is defined as necessary deviation. On this basis, a weather avoidance probability figure, composed of three deviation probability ranges, in the terminal area is obtained, as shown in FIG. 3.

Step S6: formulating a weather avoidance strategy for each flight in the predetermined airport terminal area on the basis of the arrival and departure typical flight route and the weather avoidance probability figure.

Figure 4:
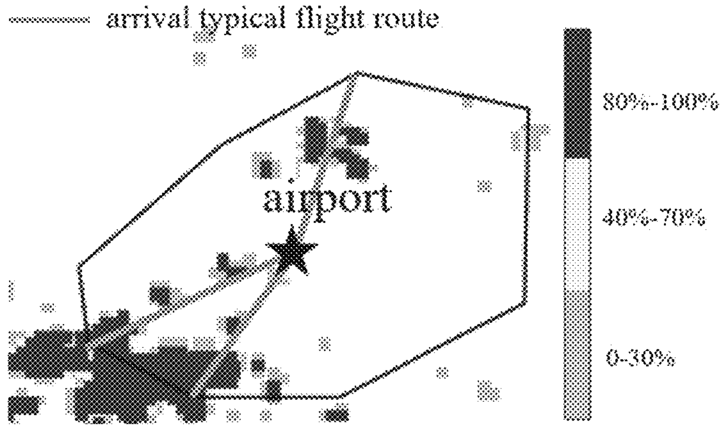
FIG. 4 is a schematic diagram showing grids with 80%-100% of deviation probability on all typical flight routes covering at least 10 cross-sections of each typical flight route.

Specifically, the weather avoidance probability figure of the terminal area is judged according to the following judgment conditions, to formulate a convective weather avoidance strategy of terminal area flights:

(1) If grids with 80%-100% of deviation probability on all arrival and departure typical flight routes cover at least 10 cross-sections of each typical flight route, then arrival flights that have taken off adopt a strategy of airborne holding or alternate landing, and arrival flights and departure flights that have not taken off adopt a strategy of waiting on the ground; otherwise, transfer to (2); in which FIG. 4 is a schematic diagram showing grids with 80%-100% of deviation probability in all typical flight routes covering at least 10 cross-sections of each typical flight route.

Figure 5:
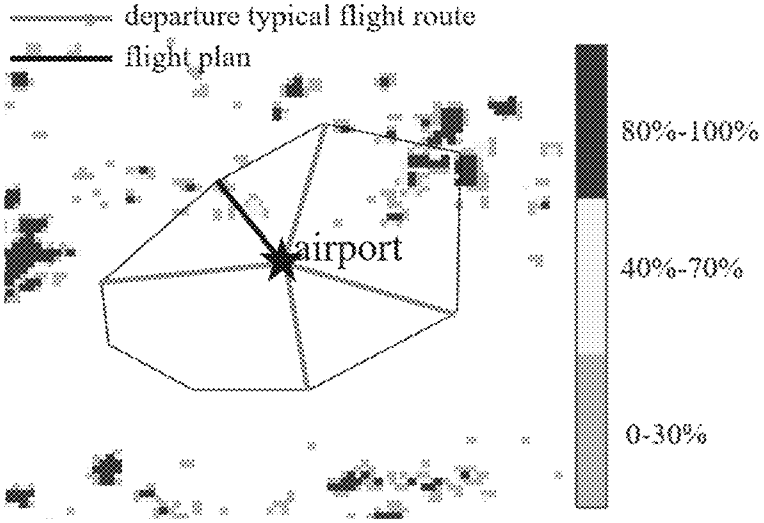
FIG. 5 is a schematic diagram showing that there are no grids with 80%-100% of deviation probability on typical flight routes and grids with 40%-70% of deviation probability do not cover any cross-section of the typical flight routes.

(2) If no grids with 80%-100% of deviation probability are on the arrival and departure typical flight routes and grids with 40%-70% of deviation probability do not cover any cross-section of the arrival and departure typical flight routes, as shown in FIG. 5, in which FIG. 5 is a schematic diagram showing that there are no grids with 80%-100% of deviation probability on typical flight routes and grids with 40%-70% of deviation probability do not cover any cross-section of the typical flight routes, then arrival and departure flights adopt a no-impact strategy, i.e. entering or leaving the terminal area according to a predetermined typical flight route; otherwise, transfer to (3). The no-impact strategy means that when the NWS grade is grade 2 or below on the arrival and departure typical flight route of the terminal area, the weather has no effect on the flight operation, and the flights fly according to the typical flight route.

(3) If there are no grids with 80%-100% of deviation probability on the arrival and departure typical flight route and grids with 40%-70% of deviation probability cover at least one cross-section of the arrival and departure typical flight route, then arrival and departure flights adopt an intrusion strategy, which allows the arrival and departure flights to intrude the grids with 40%-70% of deviation probability and to still fly according to a predetermined typical flight route; otherwise, transfer to (4). The intrusion strategy means that flights cross convective weather and still fly according to the planned typical flight route.

(4) If there are grids with 80%-100% of deviation probability on the arrival and departure typical flight route but the grids with 80%-100% of deviation probability do not cover any cross-section of the typical flight route, then arrival and departure flights adopt a diversion strategy, and bypass the width of the arrival and departure typical flight route to avoid convective weather; otherwise, transfer to (5). The diversion strategy means that flights bypass convective weather on the arrival and departure typical flight route and then return to the originally-planned arrival and departure typical flight route to continue flying.

(5) If there are grids with 80%-100% of deviation probability on the arrival and departure typical flight route and the grids with 80%-100% of deviation probability cover at least one cross-section of the arrival and departure typical flight route, then judge whether the grids with 80%-100% of deviation probability on an adjacent arrival and departure flight route cover at least one cross-section of an adjacent arrival and departure typical flight route: if not, arrival and departure flights adopt an arrival/departure point change or initial approach fix (IAF) change strategy, in which arrival flights change arrival points or initial approach fix (IAF) and departure flights change departure points, to enter or leave the terminal area from other arrival and departure typical flight routes; otherwise, transfer to (6). The arrival/departure point change strategy means that the arrival and departure flights select to enter and leave the terminal area from non-planned arrival and departure flight points. The IAF change strategy means that the arrival flights fly according to another typical flight route to another IAF point.

(6) If the weather condition on the arrival and departure typical flight route does not meet the five situations above, or controllers cannot adopt the convective weather avoidance strategy above according to the actual operation situation of the terminal area, then arrival and departure flights adopt a radar guidance strategy and enter or leave the terminal area in a manner of radar guidance. The radar guidance strategy means that controllers guide, by radar, the arrival and departure flights to select to enter and leave the terminal area from terminal area boundary positions with better weather conditions.

Figure 6:
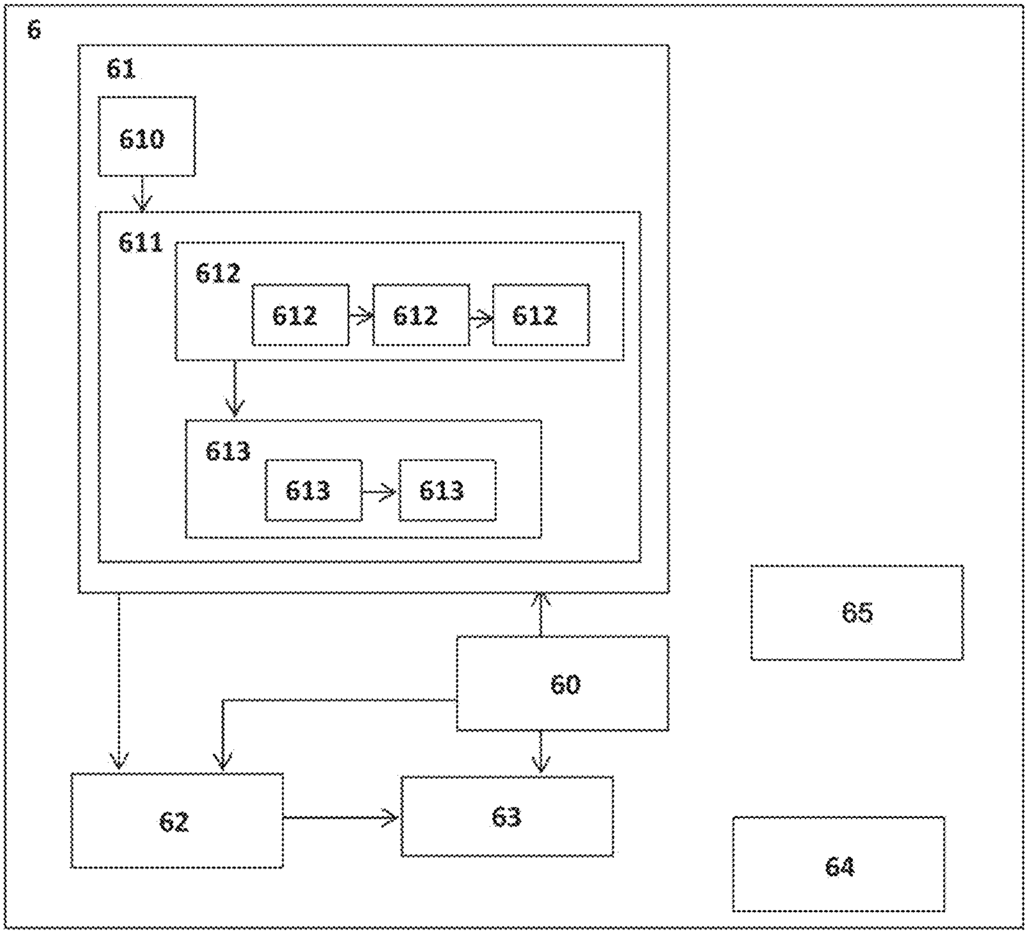
FIG. 6 is a block diagram of a determination apparatus for a weather avoidance strategy of flights according to embodiments of the present invention.

FIG. 6 is a schematic diagram of a configuration example of a determination apparatus for a weather avoidance strategy of flights according to embodiments of the present disclosure. As shown in FIG. 6, the determination apparatus 6 comprises a collection module 60, a route determination module 61, a deviation information acquisition module 62, a flight deviation probability chart generation module 63, a weather avoidance probability figure construction module 64, and a weather avoidance strategy formulation module 65.

The collection module 60 is configured to collect historical radar trajectory data and historical weather data of various flights in a predetermined airport terminal area, and collect weather forecast data in real time, and can be configured to execute step S1 described above with regard to the determination method.

The route determination module 61 can be configured to receive the historical radar trajectory data and the historical weather data from the collection module 60, and determine an arrival and departure typical flight route of each flight in the predetermined airport terminal area on the basis of the historical radar trajectory data and the historical weather data; and the route determination module is configured to execute step S2 as described above.

As an example, the route determination module 61 may comprise: a data extraction module 610, configured to extract the historical radar trajectory data of a plurality of flights in good weather conditions on the basis of the historical radar trajectory data and the historical weather data; and a calculation module 611, configured to receive the extracted historical radar trajectory data of the plurality of flights from the data extraction module 610, and calculate an arrival and departure typical flight route in the predetermined airport terminal area on the basis of the received historical radar trajectory data.

As an example, the calculation module 611 may comprise: a distance matrix construction module 612 and a cluster calculation module 613.

The distance matrix construction module 612 is configured to estimate the distance between historical radar trajectories of any two flights among the plurality of flights by using Fréchet distance, to construct a distance matrix.

As an example, the distance matrix construction module 612 may comprise: a set creation module 612*a*, configured to create a first trajectory point ordered set $\sigma(P)$ of a first historical radar trajectory consisting of p trajectory points and a second trajectory point ordered set $\sigma(Q)$ of a second historical radar trajectory consisting of q trajectory points, wherein $\sigma(P)=(u_1, u_2, \ldots, u_p)$ and $\sigma(Q)=(v_1, v_2, \ldots, v_q)$; a pairing module 612*b*, configured to pair the first trajectory point ordered set $\sigma(P)$ and the second trajectory point ordered set $\sigma(Q)$ created by the set creation module 612*a*, to obtain a sequence point pair $SC_j$: $SC_j=\{(u_{a_1}, v_{b_1}), (u_{a_2}, v_{b_2}), \ldots, (u_{a_q}, v_{b_q})\}$, j=1, 2, . . . , p, where $a_1=j$, $b_1=1$, and for i=1, . . . , q−1, $a_{i+1}=a_i$ and $b_{i+1}=b_i+1$; and a distance calculation module 612*c*, configured to calculate the distance between historical radar trajectories of any two flights, specifically, the length of the sequence point pair ||SC|| between the trajectory points of the trajectory P and the trajectory Q is calculated, wherein the length of the sequence point pair ||SC|| is defined as the maximum value of the Euclidean distance of each group of sequence point pairs in p group of sequence point pairs, as shown in the following formula:

$$\|SC_j\| = \max_{i=1,2,\ldots,q}\left(dist\left(u_{a_i}, v_{b_i}\right)\right),\ j = 1, 2, \ldots, p\Big);$$

and to calculate the Fréchet distance $D_F(P,Q)$ according to length of the sequence point pair ||SC|| by using the following calculation formula, and to take the Fréchet distance as the distance between the trajectory P and the trajectory Q:

$$D_F(P, Q) = \min_{j=1,2,\ldots,p} \|SC_j\|.$$

The cluster calculation module 613 may be configured to cluster the constructed distance matrix using a clustering algorithm, to calculate the arrival and departure typical flight route. As an example, the cluster calculation module 613 may comprise: a cluster group generation module 613*a*, configured to cluster the constructed distance matrix by using an OPTICS algorithm and by taking the Fréchet distance as a core distance, to generate a plurality of cluster groups; and an arrival and departure typical flight route determination module 613*b*, configured to determine a cluster centerline of the plurality of cluster groups on the basis of the plurality of cluster groups generated by the cluster group generation module 613*a*, and take the cluster centerline as the arrival and departure typical flight route.

It should be noted that generating a plurality of cluster groups by using the OPTICS algorithm and determining an arrival and departure typical flight path use the method described above with respect to step S2, and will not be repeated here.

The deviation information acquisition module 62 may be configured to: receive the historical weather data and the historical radar trajectory data from the collection module 60 and to receive data indicating the arrival and departure typical flight route from the route determination module 61, and to acquire deviation information indicating deviation of each flight due to severe convective weather on the basis of the historical weather data, the data indicating the arrival and departure typical flight route, and the historical radar trajectory data. Specifically, the deviation information acquisition module 62 may be further configured to: judge whether the arrival and departure typical flight route is in a severe convective weather condition on the basis of the historical weather data and the arrival and departure typical flight route; compare the distance between the arrival and departure typical flight route determined to be in the severe convective weather condition and an actual radar trajectory of each flight based on the historical radar trajectory data with a predetermined deviation threshold; and acquire, on the basis of the comparison result, deviation information indicating deviation of each flight due to the severe convective weather. The deviation information acquisition module 62 may be configured to execute step S3 in the corresponding determination method.

The flight deviation probability chart generation module 63 may be configured to: receive the historical weather data from the collection module 60, receive the data indicating the arrival and departure typical flight route from the route determination module 61, and receive the deviation information from the deviation information acquisition module 62, and to determine flight deviation probabilities under different weather conditions on the basis of the historical weather data, the arrival and departure typical flight route and the deviation information, to generate a flight deviation probability chart. Specifically, the flight deviation probability chart generation module 63 is configured to execute the processing of step S4.

The weather avoidance probability figure construction module 64 may be configured to: receive the weather forecast data from the collection module 60 and receive the flight deviation probability chart from the flight deviation probability chart generation module 63, and to construct a weather avoidance probability figure of the predetermined airport terminal area on the basis of the weather forecast data and the flight deviation probability chart.

The weather avoidance strategy formulation module 65 may be configured to: receive the arrival and departure typical flight route from the route determination module 61 and to receive the weather avoidance probability figure from the weather avoidance probability figure construction module 64, and to determine a weather avoidance strategy of each flight in the predetermined airport terminal area on the basis of the arrival and departure typical flight route and the weather avoidance probability figure. Specifically, the weather avoidance probability figure construction module 64 is configured to execute the processing of step S5, and the weather avoidance strategy formulation module 65 is configured to execute the processing of step S6, which will not be described herein again.

Figure 7:
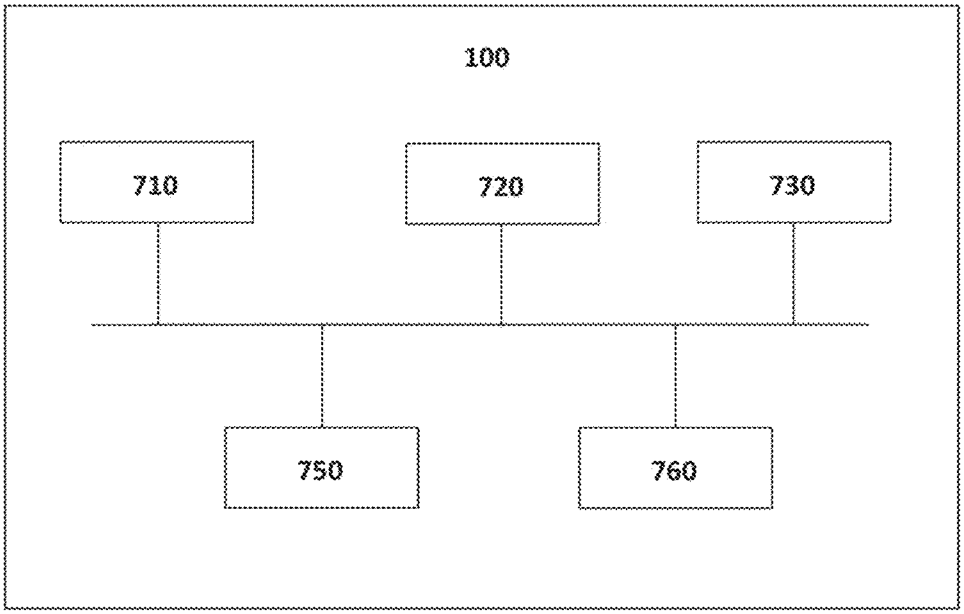
FIG. 7 is a schematic diagram of an example of a computing apparatus as part of a hardware portion which implements the determination apparatus for a weather avoidance strategy of flights according to embodiments of the present disclosure.

FIG. 7 is a schematic diagram of an example of a computing apparatus 100 as part of a hardware portion which implements the determination apparatus for a weather avoidance strategy of flights according to embodiments of the present disclosure. As illustrated in FIG. 7, the computing apparatus 100 may comprise: a CPU 710 for performing overall control, a Read Only Memory (ROM) 720 for storing system software, a Random Access Memory (RAM) 730 for storing write/read data, a storage unit 740 for storing various programs and data, an input and output unit 750 serving as an interface for input and output, and a communication unit 760 for implementing a communication function. Alternatively, the CPU 710 may be replaced by processors such as a microprocessor MCU or a programmable logic device FPGA. The input and output unit 750 may comprise various interfaces such as an input/output interface (I/O interface), a universal serial bus (USB) port (which may be included as one of ports of the I/O interface), and a network interface. A person of ordinary skill in the art could understand that the structure shown in FIG. 7 is merely exemplary, which does not limit a hardware construction of a main control system. For example, the computing apparatus 100 may also comprise more or fewer components than those as shown in FIG. 7, or have a different configuration than that shown in FIG. 7.

It should be noted that the CPU 710 described above may comprise one or more processors, wherein the one or more processors and/or other data processing circuitry may be generically referred to as a "determination apparatus for a weather avoidance strategy for flights" in the present disclosure. The data processing circuitry may be embodied wholly or in part in software, hardware, firmware, or any other combinations thereof. Furthermore, the data processing circuitry may be a single, independent processing module, or incorporated, in whole or in part, into any of the other components in the computing apparatus 100.

The storage unit 740 can be used for storing software programs and modules of application software, such as program instructions/data storage apparatus corresponding to a main control instruction calculation method described in the present disclosure; and the CPU 710 implements the described main control instruction calculation method by running the software programs and modules stored in the storage unit 740. The storage unit 740 may comprise a non-volatile memory, such as one or more magnetic storage apparatuses, flash memory, or other non-volatile solid-state memory. In some examples, the storage unit 740 may further comprise memories remotely located from the CPU 710, and these remote memories may be connected to the computing apparatus 100 over a network. Examples of the network above include, but are not limited to, the Internet, an intranet, a local area network, a mobile communication network and combinations thereof.

The communication unit 760 is used to receive or send data via a network. Specific examples of the network above may comprise a wireless network provided by a communication provider of the computing apparatus 100. In one example, the communication unit 760 comprises a network adapter (Network Interface Controller, NIC) which may be connected to other network devices using a base station, thereby being able to communicate with the Internet. In one example, the communication unit 760 may be a Radio Frequency (RF) module which is used to communicate with the Internet in a wireless manner.

Embodiments of the present disclosure also provide a computer-readable storage medium, on which a computer program is stored, and when the computer program is executed by a processor, the determination method for a weather avoidance strategy of flights as described in the embodiments above is implemented.

In an embodiment, the computer-readable storage medium above may be stored in the storage unit 740 in FIG. 7, so as to implement the determination of a weather avoidance strategy of flights in conjunction with other components in FIG. 7.

The description above only relates to preferred embodiments of the present disclosure. It should be noted that for a person of ordinary skill in the art, several improvements and modifications can also be made without departing from the principle of the present disclosure, and these improvements and modifications shall also be considered as within the scope of protection of the present disclosure.

What is claimed is:

1. A method for generating a weather avoidance strategy for flights, the method comprising:

collecting, by a computing apparatus comprising a processor and a storage unit, historical radar trajectory data and historical weather data of various flights in a predetermined airport terminal area, and receiving, via a communication unit, weather forecast data in real time;

determining an arrival and departure typical flight route of each flight in the predetermined airport terminal area on a basis of the historical radar trajectory data and the historical weather data;

acquiring deviation information indicating deviation of each flight due to severe convective weather on the basis of the historical weather data, the arrival and departure typical flight route, and the historical radar trajectory data;

determining flight deviation probabilities under different weather conditions on the basis of the historical weather data, the arrival and departure typical flight route and the deviation information, to generate a flight deviation probability chart;

constructing a weather avoidance probability figure of the predetermined airport terminal area on the basis of the weather forecast data and the flight deviation probability chart, comprising:

dividing the predetermined airport terminal area into a plurality of geographic grids defined by longitude and latitude; and determining, for each of the geographic grids, a flight deviation probability based on the weather forecast data and the flight deviation probability chart;

formulating, by the computing apparatus, a weather avoidance strategy for each flight in the predetermined airport terminal area on the basis of the arrival and departure typical flight route and the weather avoidance probability figure, comprising:

determining whether geographic grids having deviation probabilities within a predefined probability range satisfy a threshold condition relative to cross-sections of the arrival and departure typical flight route; and selecting a flight operation strategy including at least one of airborne holding, diversion, or route modification based on the determination; and controlling arrival and departure flight routes for each flight under convective weather conditions in the predetermined airport terminal area based on the weather avoidance strategy.

2. The method according to claim 1, wherein determining an arrival and departure typical flight route in the predetermined airport terminal area on the basis of the historical radar trajectory data and the historical weather data comprises:

extracting the historical radar trajectory data of a plurality of flights in good weather conditions on the basis of the historical radar trajectory data and the historical weather data; and calculating the arrival and departure typical flight route in the predetermined airport terminal area on the basis of the extracted historical radar trajectory data of the plurality of flights.

3. The method according to claim 2, wherein calculating the arrival and departure typical flight route in the predetermined airport terminal area on the basis of the extracted historical radar trajectory data of the plurality of flights comprises:

estimating a distance between historical radar trajectories of any two flights among the plurality of flights by using Fréchet distance, to construct a distance matrix; and clustering the constructed distance matrix using a clustering algorithm, to calculate the arrival and departure typical flight route.

4. The method according to claim 3, wherein the historical radar trajectories of any two flights comprise a first historical radar trajectory and a second historical radar trajectory; wherein estimating the distance between historical radar trajectories of any two flights among the plurality of flights by using Fréchet distance to construct a distance matrix comprises:

creating a first trajectory point ordered set σ(P) of the first historical radar trajectory consisting of p trajectory points and a second trajectory point ordered set σ(Q) of the second historical radar trajectory consisting of q trajectory points, wherein $\sigma(P)=(u_1, u_2, \ldots, u_p)$ and $\sigma(Q)=(v_1, v_2, \ldots, v_q)$;

pairing the created first trajectory point ordered set σ(P) and second trajectory point ordered set σ(Q) to obtain a sequence point pair $SC_j$:

$$SC_j = \{(u_{a_1}, v_{b_1}), (u_{a_2}, v_{b_2}), \ldots, (u_{a_q}, v_{b_q})\}, j = 1, 2, \ldots, p,$$

where $a_1=j$, $b_1=1$, and for $i=1, \ldots, q-1$, $a_{i+1}={}_i$ and $b_{i+1}=b_i+1$;

calculating a length of the sequence point pair ||SC|| between the trajectory points of the first historical radar trajectory and the second historical radar trajectory, wherein the length of the sequence point pair ||SC|| indicates a maximum value of a Euclidean distance of each group of sequence point pairs:

$$\|SC_j\| = \max_{i=1,2,\ldots,q}\left(dist(u_{a_i}, v_{b_i})\right), j = 1, 2, \ldots, p);$$

and calculating the Fréchet distance $D_F(P,Q)$ according to the length of the sequence point pair ||SC|| by using the following calculation formula as the distance between historical radar trajectories of any two flights among the plurality of flights:

$$D_F(P, Q) = \min_{j=1,2,\ldots,p} \|SC_j\|.$$

5. The method according to claim 3, wherein clustering the constructed distance matrix using a clustering algorithm, to calculate the arrival and departure typical flight route comprises:

clustering the obtained distance matrix on the basis of the Fréchet distance by using an OPTICS algorithm to generate a plurality of cluster groups; and determining a cluster centerline of the plurality of cluster groups on the basis of the generated plurality of cluster groups as the arrival and departure typical flight route.

6. The method according to claim 1, wherein acquiring deviation information indicating deviation of each flight due to severe convective weather on the basis of the historical weather data, the arrival and departure typical flight route, and the historical radar trajectory data comprises:

judging whether the arrival and departure typical flight route is in a severe convective weather condition on the basis of the historical weather data and the arrival and departure typical flight route;

comparing the distance between the arrival and departure typical flight route determined to be in the severe convective weather condition and an actual radar trajectory of each flight based on the historical radar trajectory data with a predetermined deviation threshold; and acquiring, on the basis of the comparison result, deviation information indicating deviation of each flight due to the severe convective weather.

7. The method according to claim 1, wherein determining flight deviation probabilities under different weather conditions on the basis of the historical weather data, the arrival and departure typical flight route and the deviation information, to generate a flight deviation probability chart, comprises:

calculating a predetermined percentile of vertically integrated liquid water content and the predetermined percentile of echo top of each flight on a corresponding arrival and departure typical flight route according to the length and width of the arrival and departure typical flight route;

dividing the predetermined percentile of vertically integrated liquid water content into a first number of grades and dividing the predetermined percentile of echo top into a second number of grades;

classifying, according to values of the predetermined percentile of vertically integrated liquid water content and values of the predetermined percentile of echo top of various flights, various flights into different vertically integrated liquid water content grades and echo top grades; and calculating the proportion of deviation flights in all flights in each condition of a vertically integrated liquid water content grade and an echo top grade as the flight deviation probability, so as to generate the flight deviation probability chart under different conditions of vertically integrated liquid water content grades and echo top grades.

8. The method according to claim 1, wherein the weather forecast data at least comprises a predetermined percentile of vertically integrated liquid water content and the predetermined percentile of echo top, wherein obtaining a weather avoidance probability figure of the predetermined airport terminal area on the basis of the weather forecast data and the flight deviation probability chart comprises:

performing calculation according to a vertically integrated liquid water content value and an echo top value of the weather forecast data and with reference to the flight deviation probability chart, to obtain a flight deviation probability of grids divided with a longitude of a predetermined longitude value and a latitude of a predetermined latitude value within the range of the predetermined airport terminal area;

defining a case where a deviation probability range is a first range as no need of deviation, defining a case where the deviation probability range is a second range as possible deviation, and defining a case where the deviation probability range is a third range as necessary deviation, wherein a lower limit value of the first range is 0, an upper limit value of the first range is less than or equal to a lower limit value of the second range, an upper limit value of the second range is less than or equal to a lower limit value of the third range, and an upper limit value of the third range is 100%; and constructing the weather avoidance probability figure using the first range, the second range, and the third range.

9. The method according to claim 8, wherein formulating a weather avoidance strategy of each flight in the predetermined airport terminal area on the basis of the arrival and departure typical flight route and the weather avoidance probability figure comprises:

i. determining whether grids with the third range of deviation possibility cover a predetermined number of cross-sections of all the arrival and departure typical flight routes, the predetermined number being at least greater than 5;

ii. if the determination result in i is yes, then arrival flights that have taken off adopting a strategy of airborne holding or alternate landing, and arrival flights and departure flights that have not taken off adopting a strategy of waiting on the ground;

iii. if the determination result in i is no, determining whether there are grids with the third range of deviation probability in the arrival and departure typical flight route;

iv. if the determination result in iii is no, executing the following steps:

a. determining whether grids with the second range of deviation probability cover at least one cross-section of the arrival and departure typical flight route;

b. if it is determined that grids with the second range of deviation possibility do not cover the at least one cross-section of the arrival and departure typical flight route, then arrival and departure flights adopting a strategy in which the flights fly according to the arrival and departure typical flight route; and c. if it is determined that grids with the second range of deviation probability cover the at least one cross-section of the arrival and departure typical flight route, then arrival and departure flights adopting an intrusion strategy to allow the arrival and departure flights to intrude the grids with the second range of deviation probability and thus to fly according to the arrival and departure typical flight route; and v. if the determination result in iii is yes, executing the following steps:

d. determining whether grids with the third range of deviation probability cover at least one cross-section of the arrival and departure typical flight route;

e. if it is determined that grids with the third range of deviation probability do not cover at least one cross-section of the arrival and departure typical flight route, then arrival and departure flights adopting a diversion strategy, wherein the diversion strategy provides that the flights bypass convective weather on the arrival and departure typical flight route and then return to the arrival and departure typical flight route to continue flying;

f. if it is determined that grids with the third range of deviation probability cover at least one cross-section of the arrival and departure typical flight route, determining whether grids with the third range of deviation probability cover at least one cross-section of another arrival and departure typical flight route adjacent to the arrival and departure typical flight route;

g. if it is determined that grids with the third range of deviation probability do not cover at least one cross-section of another arrival and departure typical flight route adjacent to the arrival and departure typical flight route, arrival and departure flights adopting a manner that the arrival and departure flights select to enter and leave the terminal area from non-planned arrival and departure flight points, or to fly to other initial approach fixes according to other typical flight routes; and h. if the described situations of i, ii, iii, iv and v are not satisfied, arrival and departure flights adopting a radar guidance strategy and entering or leaving the terminal area in a radar guidance manner.

10. The method according to claim 1, wherein the historical radar trajectory data comprises at least one of: time, call sign, ground speed, altitude, and longitude and latitude.

11. A non-transitory computer-readable program medium, storing a program which when executed by a processor, implements the method according to claim 1.

12. The method according to claim 1, wherein determining the arrival and departure typical flight route comprises extracting historical radar trajectory data of flights occurring under weather conditions at or below a predefined convective weather level and determining the arrival and departure typical flight route based on the extracted historical radar trajectory data.

13. The method according to claim 12, wherein determining the arrival and departure typical flight route comprises estimating distances between historical radar trajectories of flights using Fréchet distance and clustering the estimated distances to obtain the arrival and departure typical flight route.

14. The method according to claim 1, wherein acquiring deviation information comprises determining whether a distance between an actual radar trajectory of a flight and the corresponding arrival and departure typical flight route exceeds a predetermined deviation threshold.

15. The method according to claim 1, wherein determining the flight deviation probabilities comprises calculating a predetermined percentile of vertically integrated liquid water content and a predetermined percentile of echo top along the arrival and departure typical flight route of each flight.

16. The method according to claim 15, wherein determining the flight deviation probabilities further comprises classifying flights into grades of vertically integrated liquid water content and grades of echo top, and calculating a proportion of deviation flights under each grade combination as the flight deviation probability.

17. The method according to claim 1, wherein constructing the weather avoidance probability figure comprises dividing the predetermined airport terminal area into grids defined by longitude and latitude and assigning a deviation probability to each grid based on the weather forecast data and the flight deviation probability chart.

18. The method according to claim 17, wherein the deviation probability assigned to each grid is classified into a no-need-of-deviation range, a possible-deviation range, or a necessary-deviation range to form the weather avoidance probability figure.

19. The method according to claim 1, wherein formulating the weather avoidance strategy comprises determining whether grids classified as the necessary-deviation range cover at least a predetermined number of cross-sections of the arrival and departure typical flight route.

20. The method according to claim 1, wherein formulating the weather avoidance strategy comprises selecting at least one of an airborne holding strategy, a ground waiting strategy, a no-impact strategy, an intrusion strategy, a diversion strategy, an arrival or departure point change strategy, an initial approach fix change strategy, or a radar guidance strategy based on the weather avoidance probability figure.

* * * * *